(12) United States Patent
Viveganandhan et al.

(10) Patent No.: US 9,055,268 B2
(45) Date of Patent: Jun. 9, 2015

(54) MULTI-TIER RECORDER TO ENABLE SEEK-BACK UNIQUE COPY RECORDING

(71) Applicant: Cisco Technology, Inc., San Jose, CA (US)

(72) Inventors: Mahesh Viveganandhan, Cupertino, CA (US); Vivek Kansal, San Jose, CA (US); Gary M. Springer, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 134 days.

(21) Appl. No.: 13/758,060

(22) Filed: Feb. 4, 2013

(65) Prior Publication Data

US 2014/0219638 A1   Aug. 7, 2014

(51) Int. Cl.
*H04N 5/76* (2006.01)
*H04N 21/4147* (2011.01)
*H04N 21/433* (2011.01)
*H04N 21/4627* (2011.01)
*H04N 21/475* (2011.01)

(52) U.S. Cl.
CPC ............ *H04N 5/76* (2013.01); *H04N 21/4147* (2013.01); *H04N 21/4334* (2013.01); *H04N 21/4627* (2013.01); *H04N 21/4751* (2013.01)

(58) Field of Classification Search
CPC .. G11B 27/002; G11B 27/034; G11B 27/105; G11B 27/11; G11B 27/36; G11B 2220/2562; G11B 2220/455; G11B 2220/2516; H04N 5/76; H04N 5/85; H04N 5/765; H04N 5/781; H04N 9/79
USPC ................... 386/298, 299, 296, 291
See application file for complete search history.

(56) References Cited

U.S. PATENT DOCUMENTS

2005/0273558 A1* 12/2005 Matsuoka ..................... 711/114

* cited by examiner

*Primary Examiner* — Robert Chevalier
(74) *Attorney, Agent, or Firm* — Merchant & Gould P.C.

(57) ABSTRACT

Multi-tier recording to enable, for example, seek-back unique copy recording may be provided. First, content may be recorded to a time-shift buffer. Recording instructions may be received and a virtual recorder corresponding to a user may be instantiated. Next, content from the time-shift buffer may be obtained according to the received recording instructions. Then the obtained content may be saved to the instantiated virtual recorder.

27 Claims, 5 Drawing Sheets

MULTI-TIER RECORDER TO ENABLE SEEK-BACK UNIQUE COPY RECORDING

BACKGROUND

Cloud computing uses computing resources delivered as a service over a network (e.g., the Internet). In cloud computing, a user's data, software, and computations are entrusted to remote services. Software as a service (SaaS) may be provided through cloud computing. In a business model that uses SaaS, users are provided access to application software and databases. Cloud computing providers manage the infrastructure and platforms on which the SaaS applications run. SaaS is sometimes referred to as "on-demand software" and is usually priced on a pay-per-use basis.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
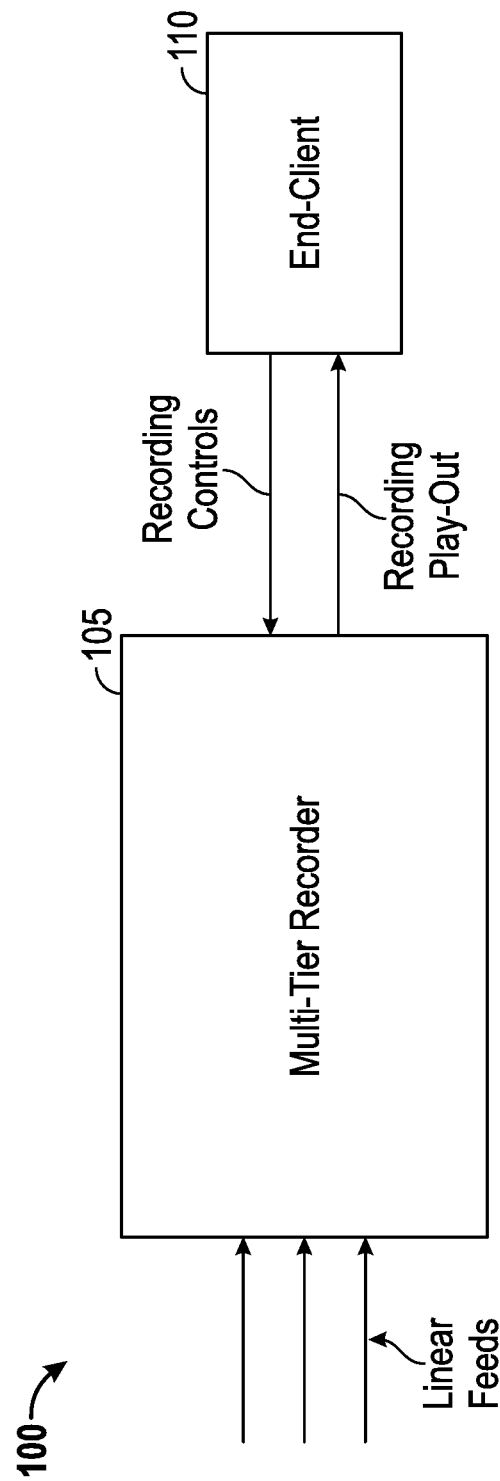
FIG. 1 shows an operating environment.

Multi-tier recording to enable, for example, seek-back unique copy recording may be provided. First, content may be recorded to a time-shift buffer. Recording instructions may be received and a virtual recorder corresponding to a user may be instantiated. Next, content from the time-shift buffer may be obtained according to the received recording instructions. Then the obtained content may be saved to the instantiated virtual recorder.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A digital video recorder (DVR) may comprise a consumer electronics device or application software that records video in a digital format to, for example, a disk drive. Cloud computing services may include cloud DVR services. Cloud DVR services may comprise a solution to emulate a user's DVR in the cloud. By enabling recording in the cloud, recorded content may be accessed from a number of devices at any time. Some in-home DVR implementations may support recording a content program from the beginning of the program or from a time the user joins a live channel (e.g., a linear feed). While these options may work for some cases, however, they may not work for the case, for example, where the user joins the content program late.

This same problem may also exist with cloud based DVR applications. Conventional cloud based recording systems may only support recording a content program if the start time of the recording is current or sometime in the future. Furthermore, there are different legal restrictions for cloud based content program recording. The restrictions vary based on geographies, but may require a unique copy per user. Embodiments of the disclosure may provide a unique copy of a content program per user recording from an arbitrary start time that can be less than the current time. In other words, embodiments of the disclosure may provide multi-tier recording to enable per-user recording of programs that were aired or started before the end-user recording setup time.

FIG. 1 is a block diagram of an operating environment 100. As shown in FIG. 1, operating environment 100 may include a multi-tier recorder 105 and an end-client 110. Multi-tier recorder 105 may receive a plurality of linear feeds. Content received from the plurality of linear feeds may be processed per recording controls received from end-client 110 and multi-tier recorder 105 may provide recording play-out back to end-client 110 in response. The plurality of linear feeds may comprise, but are not limited to, linear television channels.

Multi-tier recorder 105 may receive recording controls from end-client 110 and provide recording play-out back to end-client 110 over a network. The instructions to record (e.g. recording controls) may come from devices other than the user and/or end-client 110. Moreover, the device sending the recording request and the device consuming the recording may not be same. The network may comprise any type of network (e.g., the Internet, a hybrid fiber-coaxial (HFC) network, a content delivery network (CDN), etc.) capable of facilitating control and playback. Furthermore, multi-tier recorder 105 may receive the plurality of linear feeds in any way including receiving the plurality of linear feeds over any type of network.

End-client 110 may comprise, but is not limited to, a set-top box, a digital video recorder, a cable modem, a personal computer, a Wi-Fi access point, a cellular base station, a switch servicing multiple clients in a vicinity, a tablet device, a mobile device, a smart phone, a telephone, a remote control device, a network computer, a mainframe, a router, or other similar microcomputer-based device. End-client 110 may comprise any type device capable of sending recording controls to multi-tier recorder 105 and receiving recording play-out back from multi-tier recorder 105 in response.

Figure 2:
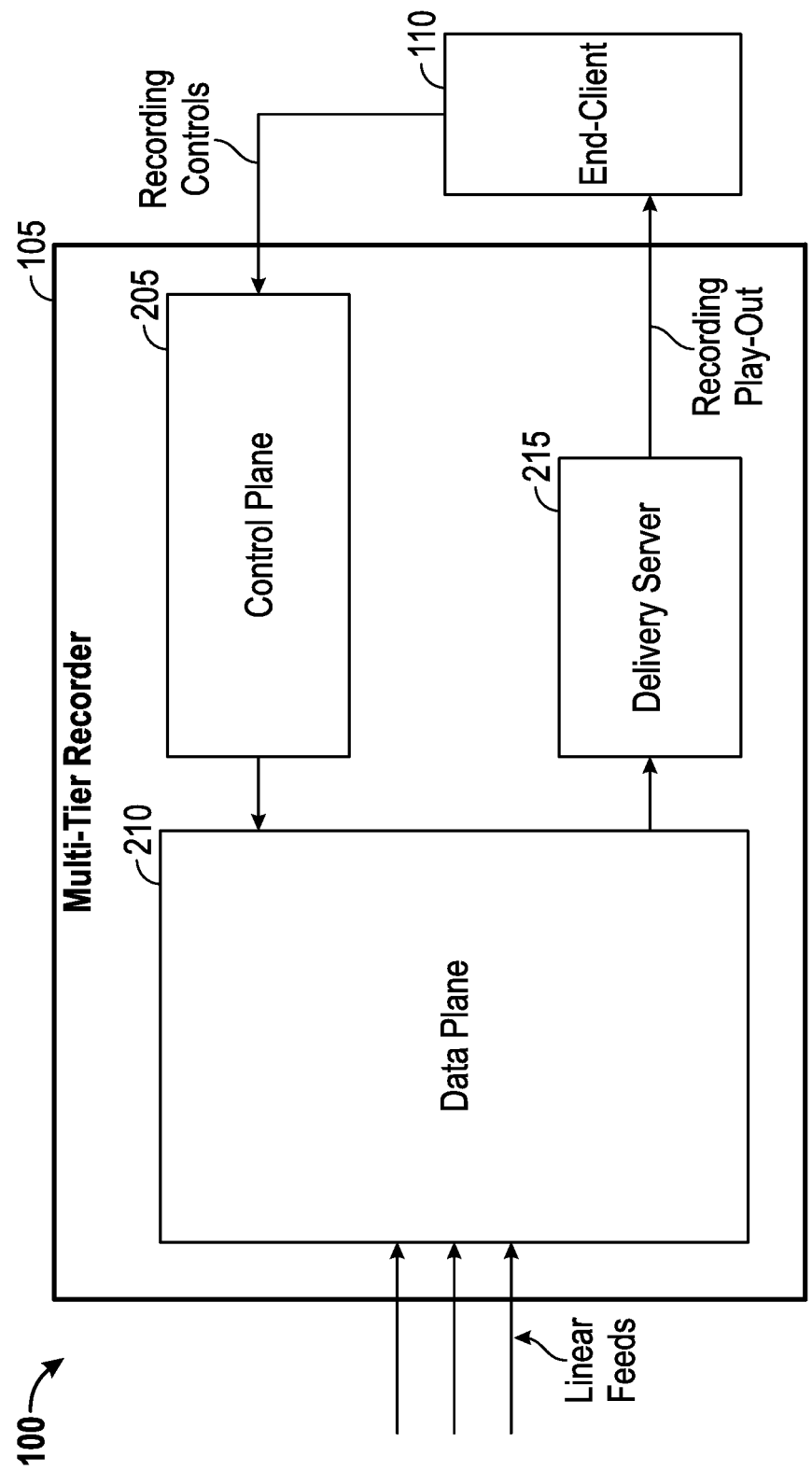
FIG. 2 shows an operating environment.

FIG. 2 is a block diagram showing operating environment 100 in greater detail. As shown in FIG. 2, multi-tier recorder 105 may comprise a control plane 205, a data plane 210, and a delivery server 215. Control plane 205 may interact with the user (e.g., through end-client 110) to obtain recording commands (e.g., recording controls) and may schedule and manage recorder resources to be allocated for the recording defined by the user. Data plane 210 may then record ones of the linear feeds according to the schedule and under the management of control plane 205. Delivery server 215 may play-out the recorded content from data plane 210 to end-client 110 (e.g., recording play-out).

Figure 3:
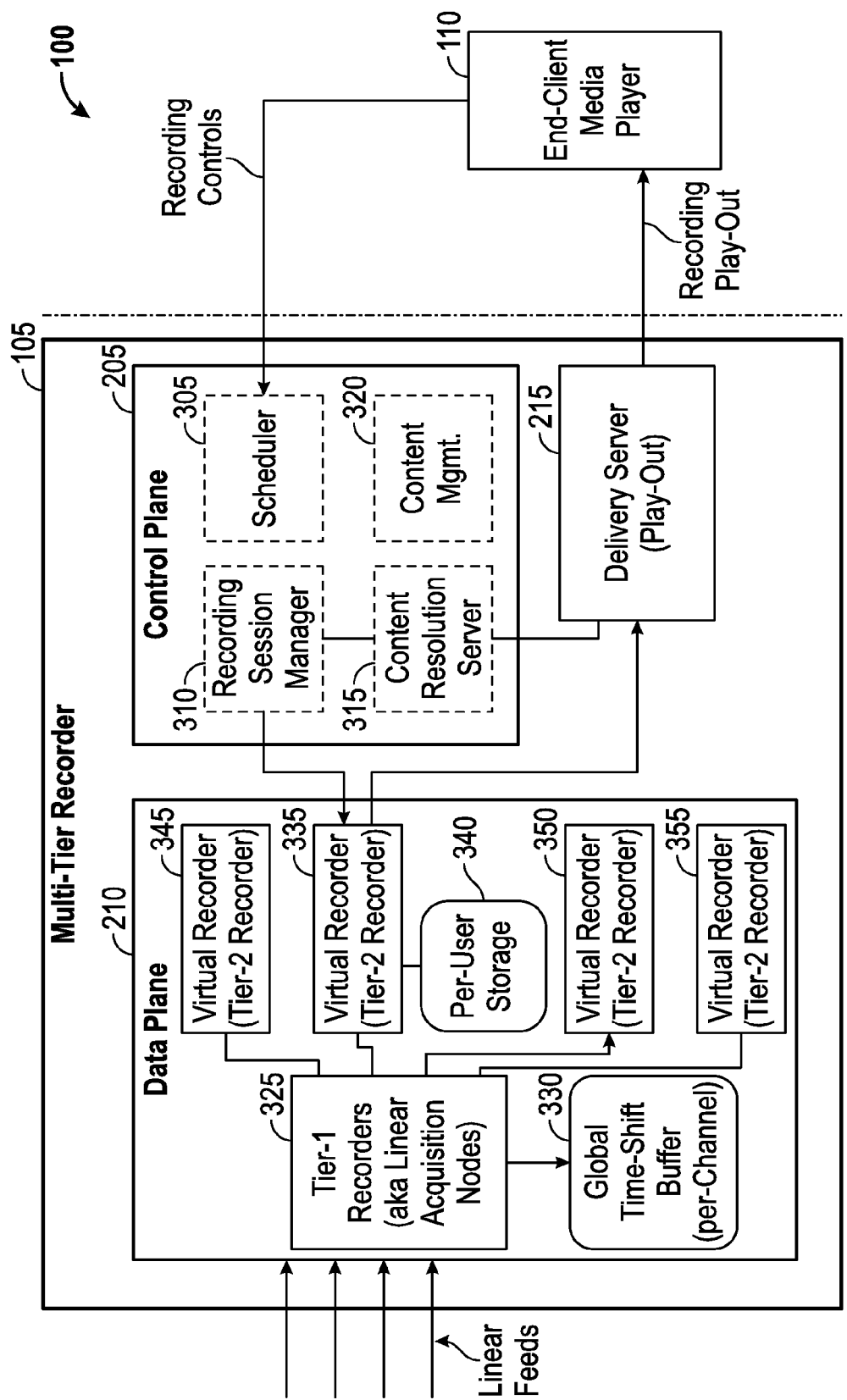
FIG. 3 shows an operating environment.

FIG. 3 is a block diagram showing control plane 205 and data plane 210 in greater detail. As shown in FIG. 3, control plane 205 may comprise a scheduler 305, a recording session manager 310, a content resolution server 315, and content management 320.

Data plane 210 may comprise tier-1 recorders and tier-2 recorders. The tier-1 recorders may comprise a linear acquisition node 325. Linear acquisition node 325 may be connected to at least one time-shift buffer 330. Time-shift buffer 330 may be used to store content corresponding one of the plurality of linear feed. Linear acquisition node 325 may be connected to a plurality of time-shift buffers, one to save content from each of the plurality of linear feed respectively.

The tier-2 recorders may comprise a plurality of virtual recorders, each having a corresponding per-user storage. For example, the plurality of virtual recorders may comprise a first virtual recorder 335 having a first per-user storage 340, a second virtual recorder 345 having a second per-user storage (not shown), a third virtual recorder 350 having a third per-user storage (not shown), and a fourth virtual recorder 355 having a fourth per-user storage (not shown).

The tier-1 recorders may not be exposed to the user (e.g., through end-client 110) and there may be no direct way for end-client 110 to consume any content from the tier-1 recorders. The tier-1 recorders may be administered by an operator of multi-tier recorder 105 and may be used as a global time-shift buffer for the tier-2 recorders to make unique copies on a per user basis. Storage resource for tier-1 recorders can be controlled based on, for example, a look back-recording window exposed by the operator.

The tier-2 recorders may be dynamically allocated by a dynamic resource management function carried out by recording session manager 310. Consistent with embodiment of the disclosure, each tier-2 recorder instance may be considered a "virtual recorder" that can be instantiated, for example, in a data-center on demand. The virtual recorders may record the content in to a storage system that has per-user quotas (e.g., per-user storage). The tier-2 recorders may not directly consume any of the plurality of linear feeds and may consume the linear feeds via the tier-1 recorders. Using tier-1 recorders as a source may allow for better resiliency in addition to providing a look-back recording function (i.e., obtaining portions of a content program precedent to when the user initiated recording).

Figure 4:
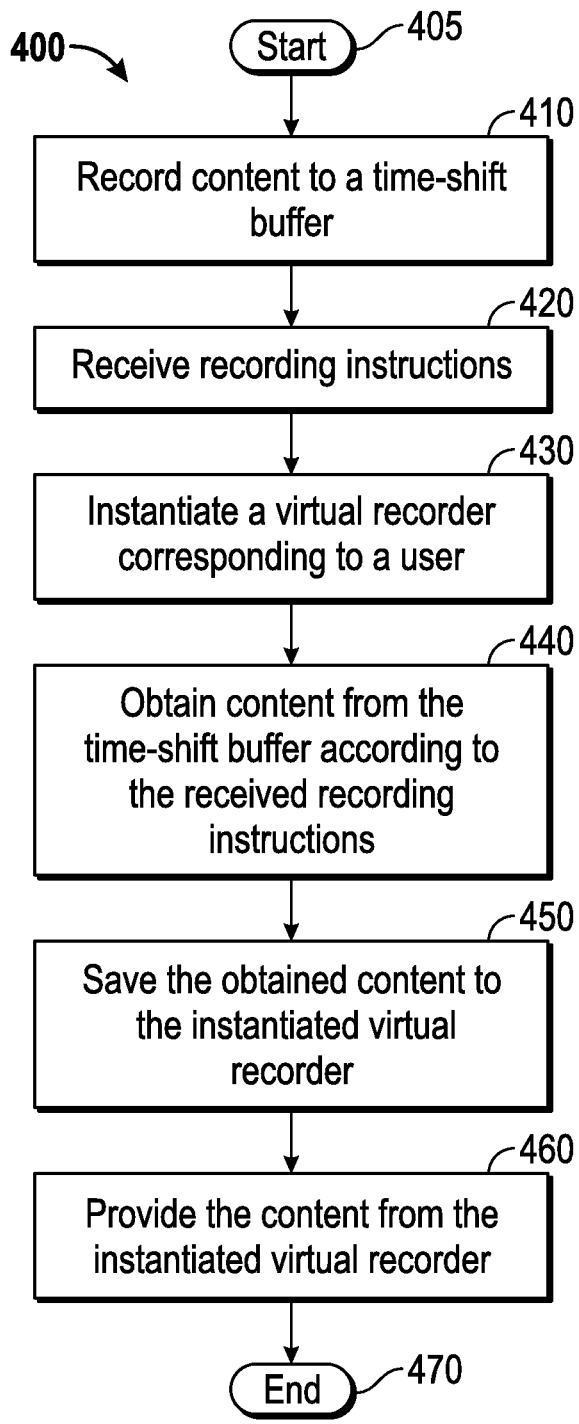
FIG. 4 is a flow chart of a method for a multi-tier recorder.

FIG. 4 is a flow chart setting forth the general stages involved in a method 400 consistent with an embodiment of the disclosure for providing multi-tier recording to enable, for example, seek-back unique copy recording. Method 400 may be implemented using multi-tier recorder 105. A computing device 500, as described in more detail below with respect to FIG. 5, may provide an operating environment for multi-tier recorder 105 or end-use client 110, for example. Ways to implement the stages of method 400 will be described in greater detail below.

Method 400 may begin at starting block 405 and proceed to stage 410 where multi-tier recorder 105 may record content to time-shift buffer 330. For example, the tier-1 recorders (e.g., linear acquisition node 325) may be configured to record each of the plurality of linear feeds for a finite sliding time-window (e.g., one day). The tier-1 recorders may guarantee the availability of the recorded content from their respective linear feed for that finite sliding time-window. This may enable the tier-2 recorders (e.g., per-user virtual recorders) to request past content. For every linear feed, the tier-1 recorder may expose a channel level manifest file that may contain references to media segments for the finite sliding time-window. This manifest file may be consumed by the tier-2 recorders. Using the manifest file, the tier-2 recorders may request, from the tier-1 recorders, any segment within the finite sliding time-window saved to global time-shift buffer 330.

From stage 410, where multi-tier recorder 105 records content to time-shift buffer 330, method 400 may advance to stage 420 where multi-tier recorder 105 may receive recording instructions. For example, scheduler 305 may interact with the user (e.g., through end-client 110) and provide different options for recording content when the user sets up a recording session. The user may be provided with choices to record from the beginning of a content program or even start recording for a previously aired program that had occurred in the past, but within the tier-1 finite sliding time-window. Recording session manager 310 may convert the instructions received from scheduler 305 into a command including a start-time and an end-time for the recording. Recording session manager 310 may send the command to the tier-2 recorders along with the reference to the tier-1 manifest file.

Once multi-tier recorder 105 receives recording instructions in stage 420, method 400 may continue to stage 430 where multi-tier recorder 105 may instantiate a virtual recorder corresponding to the user. For example, each tier-2 recorder instance may be considered a "virtual recorder" that can be instantiated, for example, in a data-center on demand. The virtual recorders may record the content in to a storage system that has per-user quotas (e.g., per-user storage). In other words, first virtual recorder 335 and its corresponding first per-user storage 340 may be instantiate for the user. In this way, a unique copy of the recorder content can be stored in a location unique to the user (e.g., first per-user storage 340). And if needed, content prior in time to the time the users initiated recording can be obtained from time-shift buffer 330.

After multi-tier recorder 105 instantiates the virtual recorder corresponding to the user in stage 430, method 400 may proceed to stage 440 where multi-tier recorder 105 may obtain content from time-shift buffer 330 according to the received recording instructions. For example, the tier-2 recorders, for every user-recording, may pull the manifest file from the tier-1 recorders, map the start-time to the segment in the manifest file, and start pulling in the segments from time-shift buffer 330 for storage.

Consistent with embodiments of the disclosure, the tier-2 recorders may throttle the fill from the tier-1 recorders (e.g., from time-shift buffer 330) to further reduce peak write throughput that may be required in the storage system. The throttling rate may not be too low and may be controlled taking in to account the finite sliding time-window of time shift buffer 330 that may be specified in the linear manifest file. If the user wants to consume the data at the same time, the throttling can be disabled and the fragments can be on-demand pulled and recorded. The tier-2 recorders may be recording to a user-specific location (e.g., first per-user storage 340) that may be known to content management 320 and content resolution server 315.

From stage 440, where multi-tier recorder 105 obtained content from time-shift buffer 330 according to the received recording instructions, method 400 may advance to stage 450 where multi-tier recorder 105 may save the obtained content to the instantiated virtual recorder. For example, a unique copy recording of the content corresponding to the received recording instructions may be maintained for the user in first per-user storage 340, which may comprise the instantiated virtual recorder.

Once multi-tier recorder 105 saves the obtained content to the instantiated virtual recorder (e.g., first per-user storage 340) in stage 450, method 400 may continue to stage 460 where multi-tier recorder 105 may provide the content from the instantiated virtual recorder. For example, whenever the user intends to consume the recorded content, delivery server 215 may query content resolution server 315 to locate the specific tier-2 recorders to pull the recorded content from. In cases where the recording is complete, delivery server 215 may also mount the same network shares.

Consequently, multi-tier recording may be provided to enable per-user recording of programs that were aired or started before the end-user recording setup time. Since the tier-1 recorders may not be exposed to the users, embodiments of the disclosure may remove some of the legal issues in unique copy recording while providing an improved user-experience and value added feature that may not be supported by conventional in-home DVRs. Moreover, the multi-tier recording consistent with embodiments of the disclosure may increase the resiliency of the recording solution. For example, the tier-2 recorders may pull segments from the redundant tier-1 recorders (e.g., global time-shift buffer 330) in case of a segment retrieval failure. In addition the tier-2 recorders may pre-fetch segments based on peak write constraints of the attached Network storage and may adaptively determine the retrieval rate. Once multi-tier recorder 105 provides the content from the instantiated virtual recorder (e.g., first per-user storage 340) in stage 460, method 400 may then end at stage 470.

Figure 5:
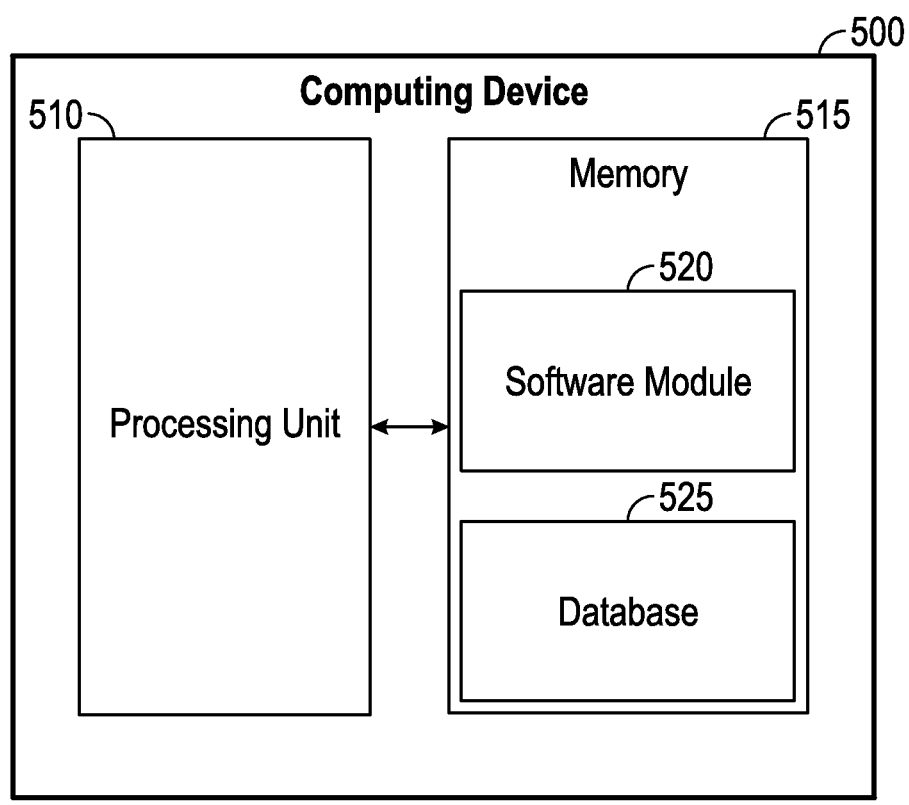
FIG. 5 shows a computing device.

FIG. 5 shows computing device 500 in more detail. As shown in FIG. 5, computing device 500 may include a processing unit 510 and a memory unit 515. Memory unit 515 may include a software module 520 and a database 525. While executing on processing unit 510, software module 520 may perform processes for providing multi-tier recording to enable, for example, seek-back unique copy recording, including for example, any one or more of the stages from method 400 described above with respect to FIG. 4. Computing device 500, for example, may provide an operating environment for multi-tier recorder 105 or end-use client 110. Multi-tier recorder 105 or end-use client 110 may operate in other environments and are not limited to computing device 500.

Computing device 500 ("the processor") may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a smart TV-like device, a network storage device, a network relay devices, or other similar microcomputer-based device. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and the processor may comprise other systems or devices.

An embodiment consistent with the disclosure may comprise a system for providing multi-tier recording to enable, for example, seek-back unique copy recording. The system may comprise a memory storage and a processing unit coupled to the memory storage. The processing unit may be operative to record content to a time-shift buffer and to receive recording instructions. Furthermore, the processing unit may be operative to instantiate a virtual recorder corresponding to a user, obtain content from the time-shift buffer according to the received recording instructions, and save the obtained content to the instantiated virtual recorder.

Another embodiment consistent with the disclosure may comprise a system for providing multi-tier recording to enable, for example, seek-back unique copy recording. The system may comprise a memory storage and a processing unit coupled to the memory storage. The processing unit may be operative to instantiate a virtual recorder corresponding to a user in response to receiving recording instructions and to obtain content from a time-shift buffer according to and in response to the received recording instructions. In addition, the processing unit may be operative to save the obtained content to the instantiated virtual recorder, provide the obtained content from the instantiated virtual recorder to an end-use client, and un-instantiate the virtual recorder in response to providing the obtained content.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    recording content to a time-shift buffer, wherein recording the content to the time-shift buffer comprises maintaining the content in the time-shift buffer within a finite sliding time-window and maintaining a manifest file comprising reference to media segments for the finite sliding time-window;
    receiving recording instructions;
    instantiating a virtual recorder corresponding to a user;
    obtaining content from the time-shift buffer according to the received recording instructions; and
    saving the obtained content to the instantiated virtual recorder.

2. The method of claim 1, wherein recording the content to the time-shift buffer comprises maintaining the content in the time-shift buffer within the finite sliding time-window comprising at least 24 hours.

3. The method of claim 1, wherein recording the content to the time-shift buffer comprises:
    obtaining the content from one of a plurality of linear feeds by a linear acquisition node; and
    saving, by the linear acquisition node, the content to the time-shift buffer.

4. The method of claim 1, wherein recording the content to the time-shift buffer comprises obtaining the content from one of a plurality of linear feeds.

5. The method of claim 1, wherein receiving recording instructions comprises receiving recording instructions from the user.

6. The method of claim 1, wherein receiving recording instructions comprises receiving recording instructions from the user through an end-client.

7. The method of claim 1, wherein instantiating the virtual recorder corresponding to the user comprises instantiating the virtual recorder in response to receiving the recording instructions.

8. The method of claim 1, wherein instantiating the virtual recorder corresponding to the user comprises instantiating the virtual recorder in a data-center on demand.

9. The method of claim 1, wherein obtaining the content from the time-shift buffer according to the received recording instructions comprises querying the manifest file for information regarding the media segments within the time-shift buffer.

10. The method of claim 1, wherein obtaining the content from the time-shift buffer according to the received recording instructions comprises obtaining content previous to a time at which the recording instructions were received.

11. The method of claim 1, wherein saving the obtained content to the instantiated virtual recorder comprises saving the obtained content by the instantiated virtual recorder to per-user storage unique to the user.

12. The method of claim 11, wherein saving the obtained content to the instantiated virtual recorder comprises saving the obtained content wherein the per-user storage and the time-shift buffer are within the same data plane of a multi-tier recorder.

13. The method of claim 1, further comprising providing the content from the instantiated virtual recorder.

14. The method of claim 1, further comprising providing the content from the instantiated virtual recorder to an end-use client from which the user transmitted the recording instructions.

15. An apparatus comprising:
    a data plane configured to:
        receive content from at least one linear feed, and
        store the received content in a time-shift buffer, wherein the received content is maintained in the time-shift buffer for a finite sliding time-window, and wherein a manifest file comprising reference to media segments for the finite sliding time-window is maintained in the time-shift buffer; and
    a control plane configured to:
        receive recording instructions,
        cause the data plane to instantiate a virtual recorder corresponding to a user,
        cause the data plane to obtain content from the time-shift buffer according to the received recording instructions, and
        cause the data plane to save the obtained content to the instantiated virtual recorder.

16. The apparatus of claim 15, wherein the control plane is further configured to cause the data plane to provide the content from the instantiated virtual recorder to an end-use client.

17. The apparatus of claim 15, wherein the control plane is further configured to cause the data plane to provide the content from the instantiated virtual recorder to an end-use client through a delivery server.

18. The apparatus of claim 15, wherein the control plane being configured to receive recording instructions comprises the control plane being configured to receive recording instructions from the user.

19. The apparatus of claim 15, wherein the control plane being configured to receive recording instructions comprises the control plane being configured to receive recording instructions from the user through an end-client.

20. A method comprising:
    instantiating a virtual recorder corresponding to a user in response to receiving recording instructions;
    obtaining content from a time-shift buffer according to and in response to the received recording instructions, wherein obtaining the content from the time-shift buffer further comprises obtaining a manifest file comprising reference to media segments stored on the time-shift buffer, wherein the content is maintained in the time-shift buffer for a finite sliding time-window;

saving the obtained content to the instantiated virtual recorder;

providing the obtained content from the instantiated virtual recorder to an end-use client; and un-instantiating the virtual recorder in response to providing the obtained content.

21. The method of claim 20, wherein providing the obtained content to the end-use client comprises providing the obtained content to the end-use client through a delivery server.

22. The method of claim 20, further comprising recording the content to the time-shift buffer.

23. The method of claim 22, wherein recording the content to the time-shift buffer comprises obtaining the content from one of a plurality of linear feeds.

24. The method of claim 20, wherein obtaining the content from the time-shift buffer according to the received recording instructions comprises obtaining content previous to a time at which the recording instructions were received.

25. The method of claim 1, wherein obtaining the content from the time-shift buffer according to the received recording instructions comprises querying the manifest file for information regarding one of the media segments within the time-shift buffer.

26. The method of claim 1, wherein obtaining the content from the time-shift buffer according to the received recording instructions comprises:

receiving the manifest file from the time-shift buffer;

receiving a start time from the received recording instructions;

identifying one of the media segments corresponding to the start time from the manifest file; and pulling, starting from the identified one of the media segments, the media segments from the time-shift buffer.

27. The method of claim 1, wherein maintaining the content in the time-shift buffer within the finite sliding time-window comprises maintaining the content the time-shift buffer for a look-back recording window specified by an operator.

* * * * *